(12) United States Patent
Hulway

(10) Patent No.: US 9,527,421 B2
(45) Date of Patent: Dec. 27, 2016

(54) ELECTRO-ACTIVE POLYMER ACTUATORS FOR VEHICLE SEATING APPLICATIONS

(71) Applicant: Ford Global Technologies, LLC, Dearborn, MI (US)

(72) Inventor: Michael Hulway, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 14/152,219

(22) Filed: Jan. 10, 2014

(65) Prior Publication Data

US 2015/0197173 A1    Jul. 16, 2015

(51) Int. Cl.
| | | |
|---|---|---|
| *A47C 7/46* | (2006.01) | |
| *B60N 2/64* | (2006.01) | |
| *B60N 2/44* | (2006.01) | |
| *B60N 2/02* | (2006.01) | |
| *B60N 2/66* | (2006.01) | |

(52) U.S. Cl.
CPC ............. *B60N 2/643* (2013.01); *B60N 2/0224* (2013.01); *B60N 2/4492* (2015.04); *B60N 2/646* (2013.01); *B60N 2/667* (2015.04); *A47C 7/46* (2013.01); *B60N 2002/4425* (2013.01)

(58) Field of Classification Search
CPC ........................................................ A47C 7/46
USPC ........................................... 297/284.3, 284.9
See application file for complete search history.

(56) References Cited

U.S. PATENT DOCUMENTS

| | | | |
|---|---|---|---|
| 4,944,554 A * | 7/1990 | Gross et al. ............... | 297/284.3 |
| 5,558,398 A * | 9/1996 | Santos ...................... | A47C 4/54 |
| | | | 297/284.3 |
| 7,729,828 B2 | 6/2010 | Gandhi | |
| 7,909,403 B2 * | 3/2011 | Lawall et al. ............. | 297/284.9 |
| 8,100,471 B2 | 1/2012 | Lawall et al. | |
| 2009/0224584 A1 | 9/2009 | Lawall et al. | |

FOREIGN PATENT DOCUMENTS

| | | |
|---|---|---|
| DE | 102012014049 | 3/2013 |
| WO | 2012130898 | 10/2012 |

OTHER PUBLICATIONS

Artificial Muscle Inc., "Artificial Muscle Introduces World's First Line of Standard Electroactive Polymer (EAP) Linear Actua," Jan. 25, 2006, Menlo Park, California.

* cited by examiner

*Primary Examiner* — Syed A Islam
(74) *Attorney, Agent, or Firm* — Vichit Chea; Price Heneveld LLP

(57) ABSTRACT

A vehicle seat comprising a seat base and seat back each including a spring structure, planar electro-active polymer actuators, each having a first state and coupled to one of the spring structures, a control in communication with the actuators and configured to deliver a predetermined electrical input to one or more of the actuators, wherein the predetermined electrical input deforms at least one of the actuators to a second state.

19 Claims, 10 Drawing Sheets

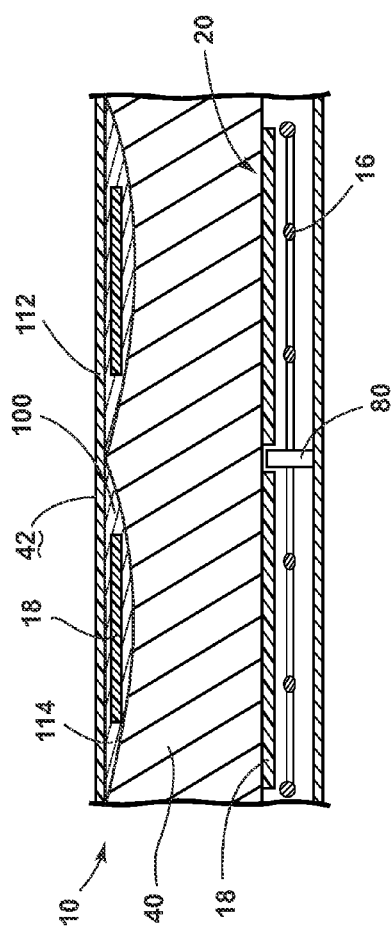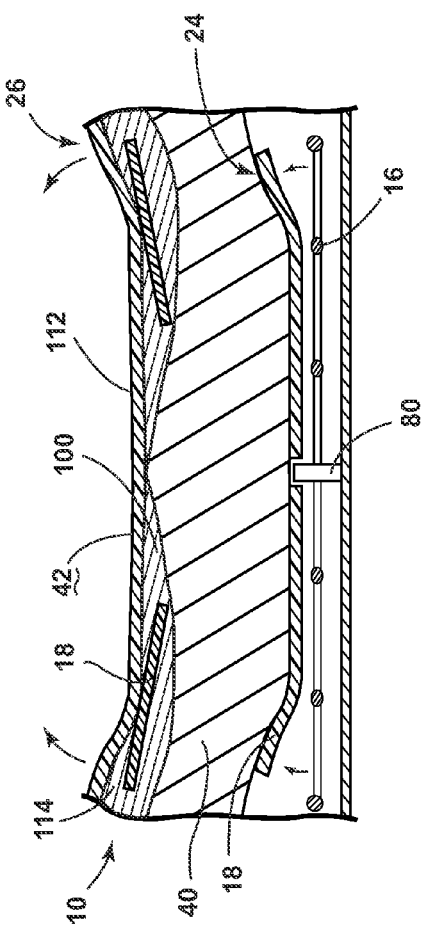

ELECTRO-ACTIVE POLYMER ACTUATORS FOR VEHICLE SEATING APPLICATIONS

FIELD OF THE INVENTION

The present invention generally relates to adjustable vehicle seating, and more specifically, vehicle seating having electro-active polymer actuators configured to provide seating adjustability.

BACKGROUND OF THE INVENTION

Typical automobile seating includes various adjusting mechanisms that can include lumbar supports, adjustable bolsters and other adjustment applications that are configured to provide comfort to the occupant of the vehicle. The mechanisms that provide this adjustability can use substantial amounts of space within the seating in order to operate. This desire for adjustability of vehicular seating can, in some applications, be limited by the desire for additional space within the vehicle cabin that can be provided by smaller seating assemblies.

SUMMARY OF THE INVENTION

In at least one aspect, a vehicle seat includes a seat base and a seat back, each having a spring structure and a cushion. Planar electro-active polymer actuators each have a first side coupled with the spring structure and an opposing second side positioned distal from the spring structure and in direct communication with the cushion. Each of the actuators is disposed in a first state. A control for the actuators is in communication with the actuators and is configured to deliver a predetermined electrical input to one or more of the actuators. The predetermined electrical input is configured to deform at least one of the actuators to a second state. The deformation of each actuator from the first state to the second state directly operates the cushion between a plurality of comfort positions.

In at least another aspect, a cushion for a vehicle seat includes an internal suspension structure and an outer surface. Planar electro-active polymer actuators are disposed between the internal suspension structure and the outer surface. Each of the actuators includes a resting state and a deformed state, wherein the movement of the actuators between the resting state and the deformed state defines a plurality of comfort positions of the outer surface.

In at least another aspect, a cushion for a vehicle seat includes at least one planar electro-active polymer actuator, a suspension structure that supports the at least one actuator, and an external covering in communication with the at least one actuator. A control is in communication with each of the at least one actuator and delivers a predetermined electrical input to the actuators. The predetermined electrical input moves the at least one actuator from a resting state to a deformed state.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8 is a cross-sectional view of the seat back of FIG. 3 taken at line VII-VII, showing the actuators in a resting first state;

FIG. 9 is the cross-sectional view of FIG. 8 showing the actuators in a deformed second state;

DETAILED DESCRIPTION OF THE PREFERRED EMBODIMENTS

Figure 1:
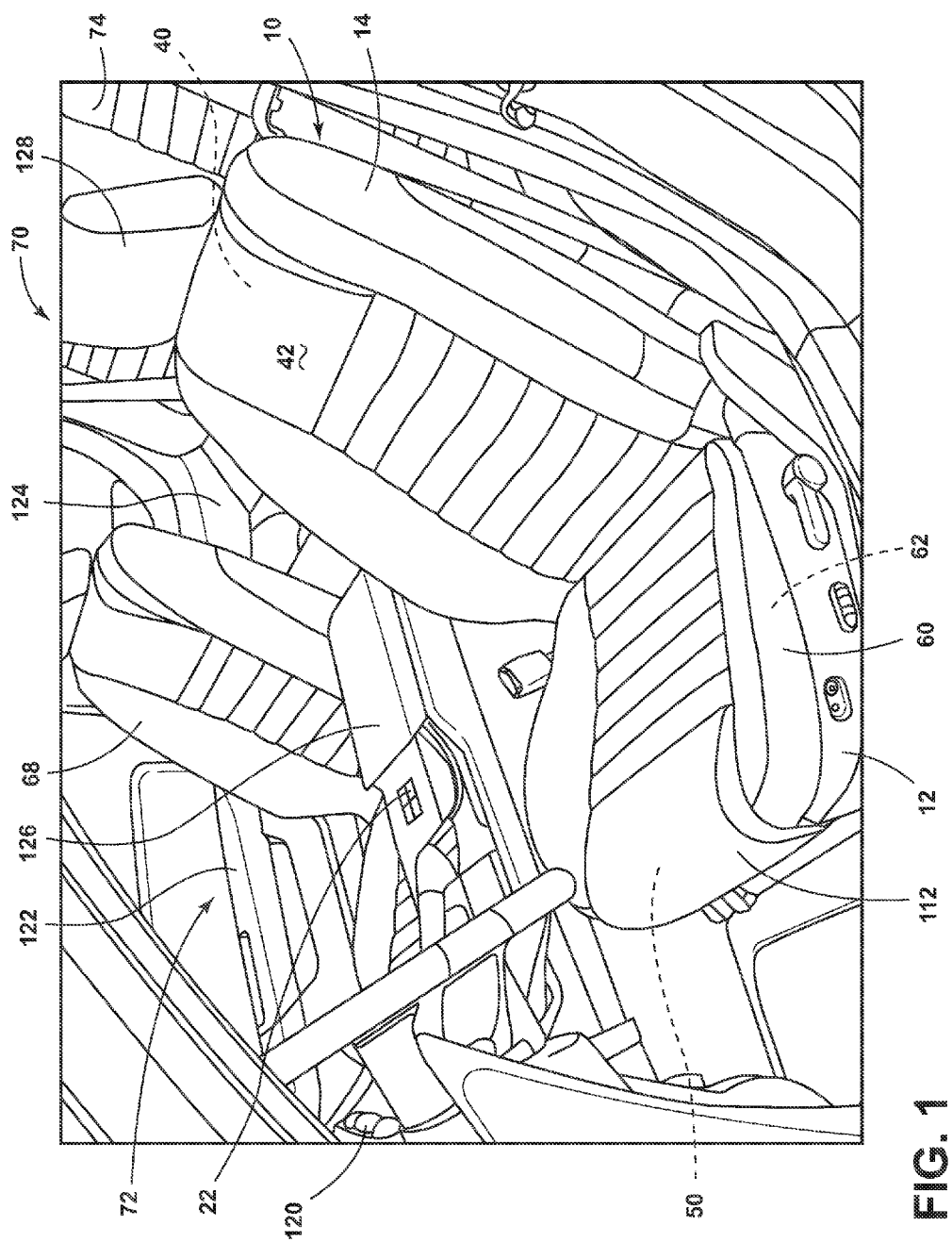
FIG. 1 is a top side perspective of the interior of a vehicle, with an embodiment of the electro-active polymer actuators installed within the vehicle seats.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIG. 1, reference numeral 10 generally refers to a vehicle seat that includes a seat base 12 and a seat back 14, each having a spring structure 16 and a cushion. Planar electro-active polymer actuators 18 each have a first side coupled with the spring structure 16 and an opposing second side positioned distal from the spring structure 16 and in direct communication with the cushion. Each of the actuators 18 is disposed in a first state 20. A control 22 for the actuators 18 is in communication with the actuators 18 and is configured to deliver a predetermined electrical input to one or more of the actuators 18. The predetermined electrical input is configured to deform at least one of the actuators 18 to a second state 24. The deformation of each actuator 18 from the first state 20 to the second state 24 directly operates the cushion between a plurality of comfort positions 26.

Referring now to the embodiment shown in FIGS. 1-10, the seat back 14 includes a back cushion 40 that is in communication with at least one actuator 18 of the seat back 14. In this manner, the deformation of each of the actuators 18 of the seat back 14 between the first and second states 20, 24 operates an outer surface 42 of the vehicle seat 10 at the back cushion 40 between a plurality of back cushion 40 comfort positions 26. In the various embodiments, the first state 20 of each of the actuators 18 is typically a rest state, where little to no electrical input is being applied to the actuator 18. The second state 24 of each of the actuators 18 includes a plurality of actuator positions that can vary depending upon the electrical input supplied to each of the actuators 18. The seat base 12 includes a seat cushion 50 that is configured to be in communication with at least one actuator 18 of the seat base 12. Similar to the seat back 14, the deformation of one or more of the actuators 18 of the seat base 12 between the first and second states 20, 24 operates the outer surface 42 of the vehicle seat 10 at the seat cushion 50 between a plurality of seat cushion 50 comfort positions 26.

Figure 11:
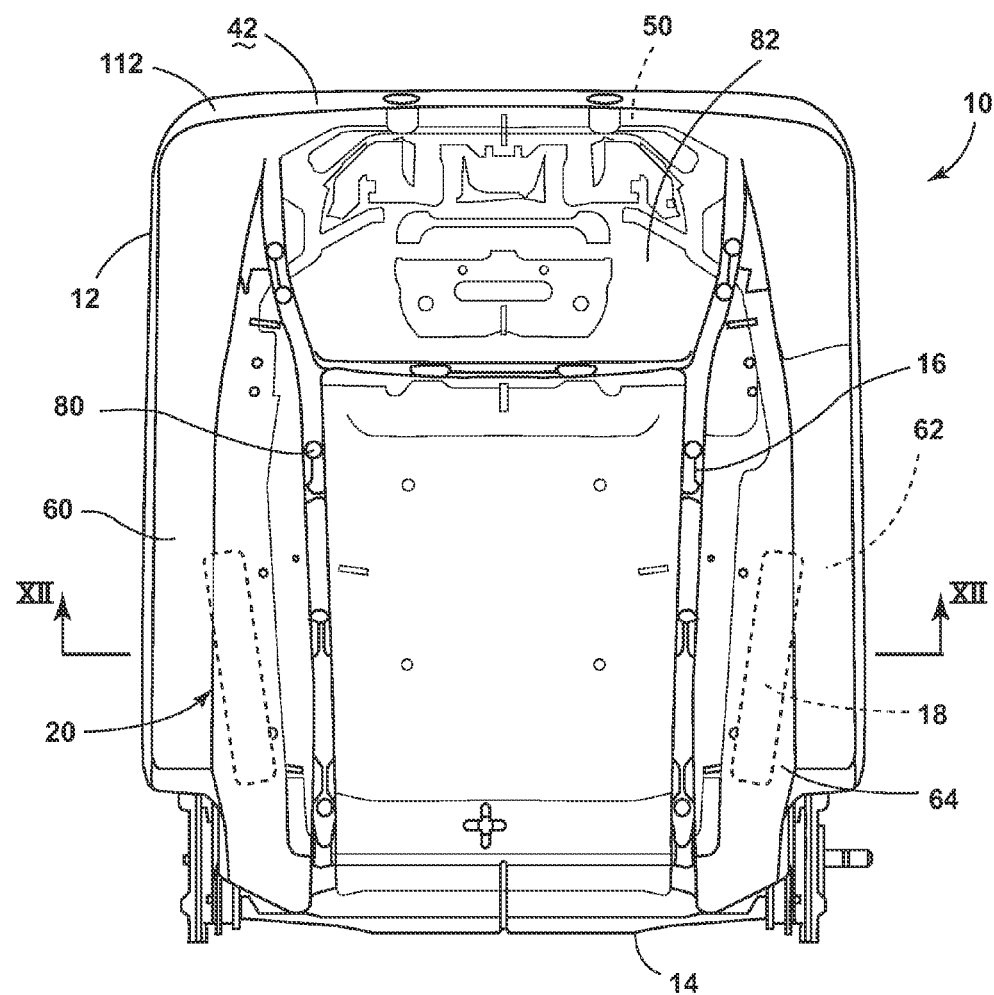
FIG. 11 is a bottom plan view of the seat base of FIG. 2.
Figure 12:
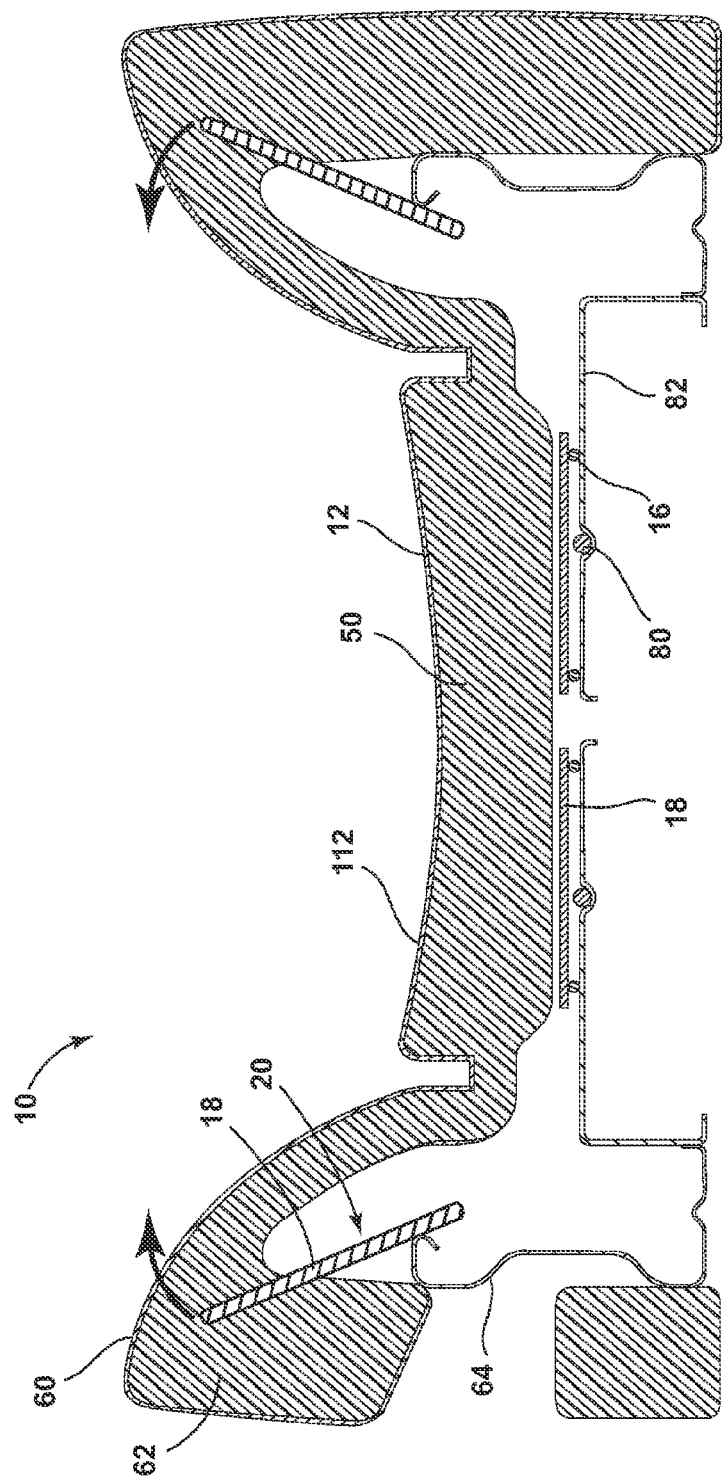
FIG. 12 is a cross-sectional view of the embodiment of FIG. 11, taken along line XII-XII and showing the actuators in a resting first state.
Figure 13:
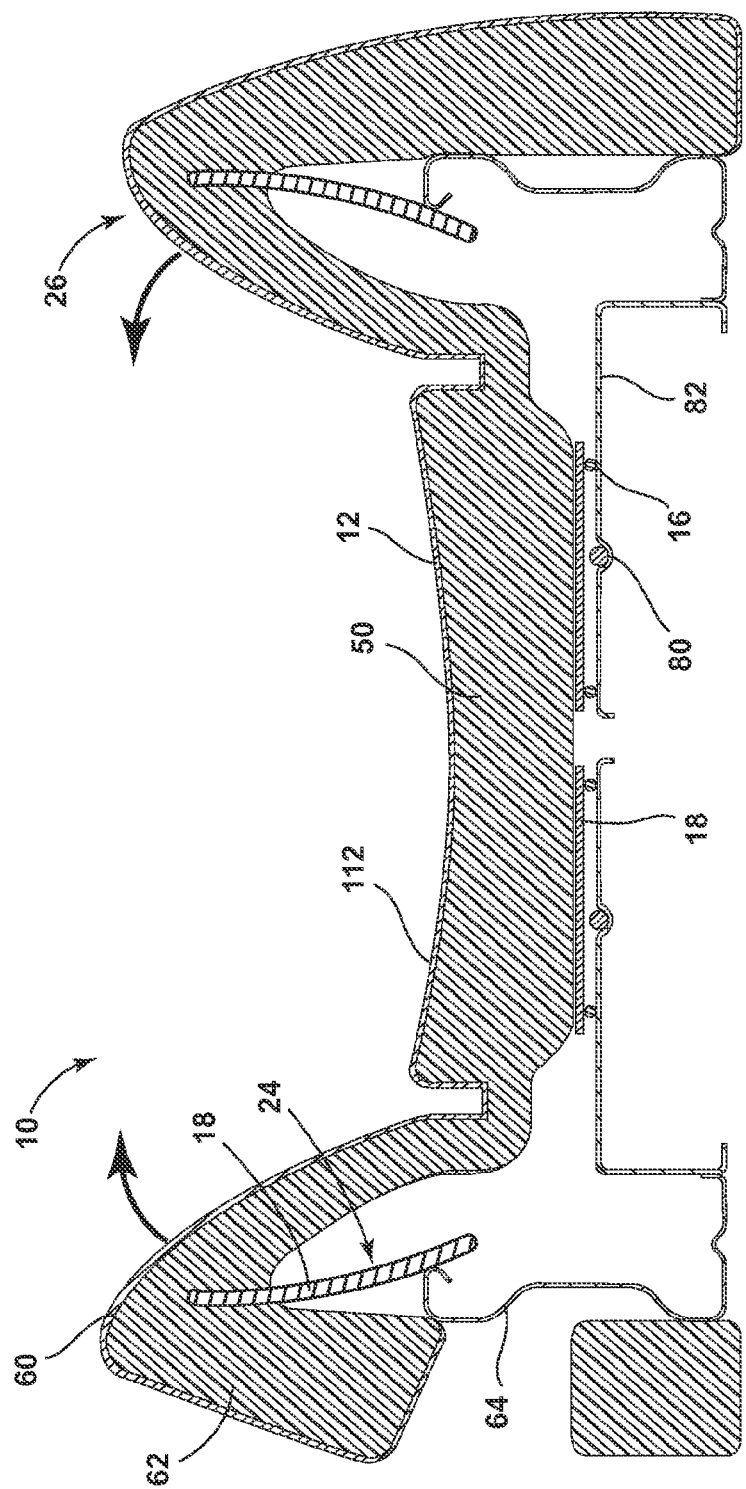
FIG. 13 is the cross-sectional view of FIG. 12 showing the actuators in a deformed second state.

Referring now to FIGS. 11-13, the vehicle seat 10 can also include one or more side bolsters 60 that can be positioned on the seat base 12, the seat back 14, or both. A bolster cushion 62 is disposed within the side bolster 60 and is in communication with at least one of the actuators 18. The actuator 18 for the side bolster 60 can be placed upon either the seat base 12 or the seat back 14. In various embodiments, the side bolster 60 can include a separate bolster frame 64 that is configured to receive one or more actuators 18. The deformation of at least one of the actuators 18 within the side bolster 60 between the first and second states 20, 24 is configured to operate the outer surface 42 of the vehicle seat 10 at the bolster cushion 62 between a plurality of side bolster 60 comfort positions 26.

Figure 2:
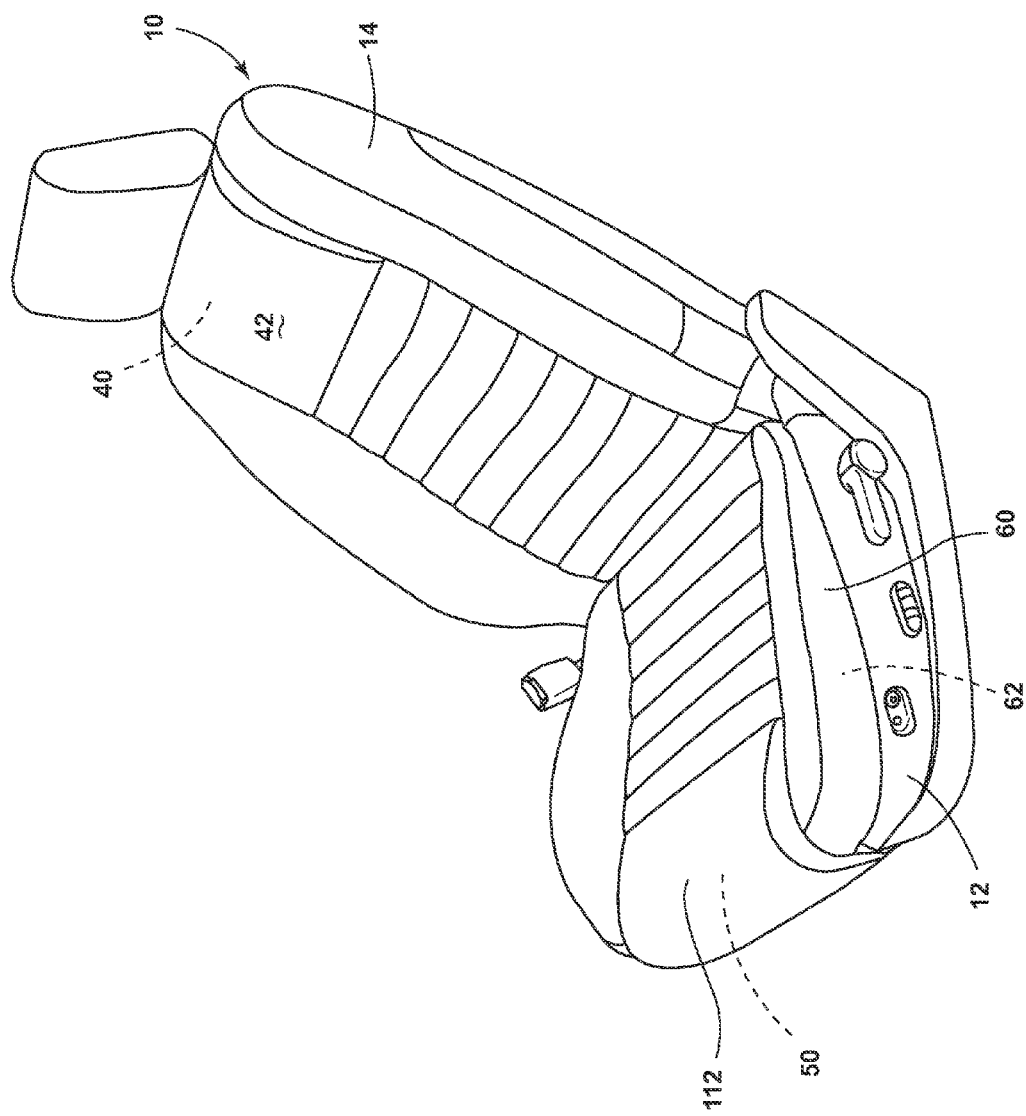
FIG. 2 is a top side perspective view of the vehicle seat of FIG. 1 removed from the vehicle cabin.
Figure 3:
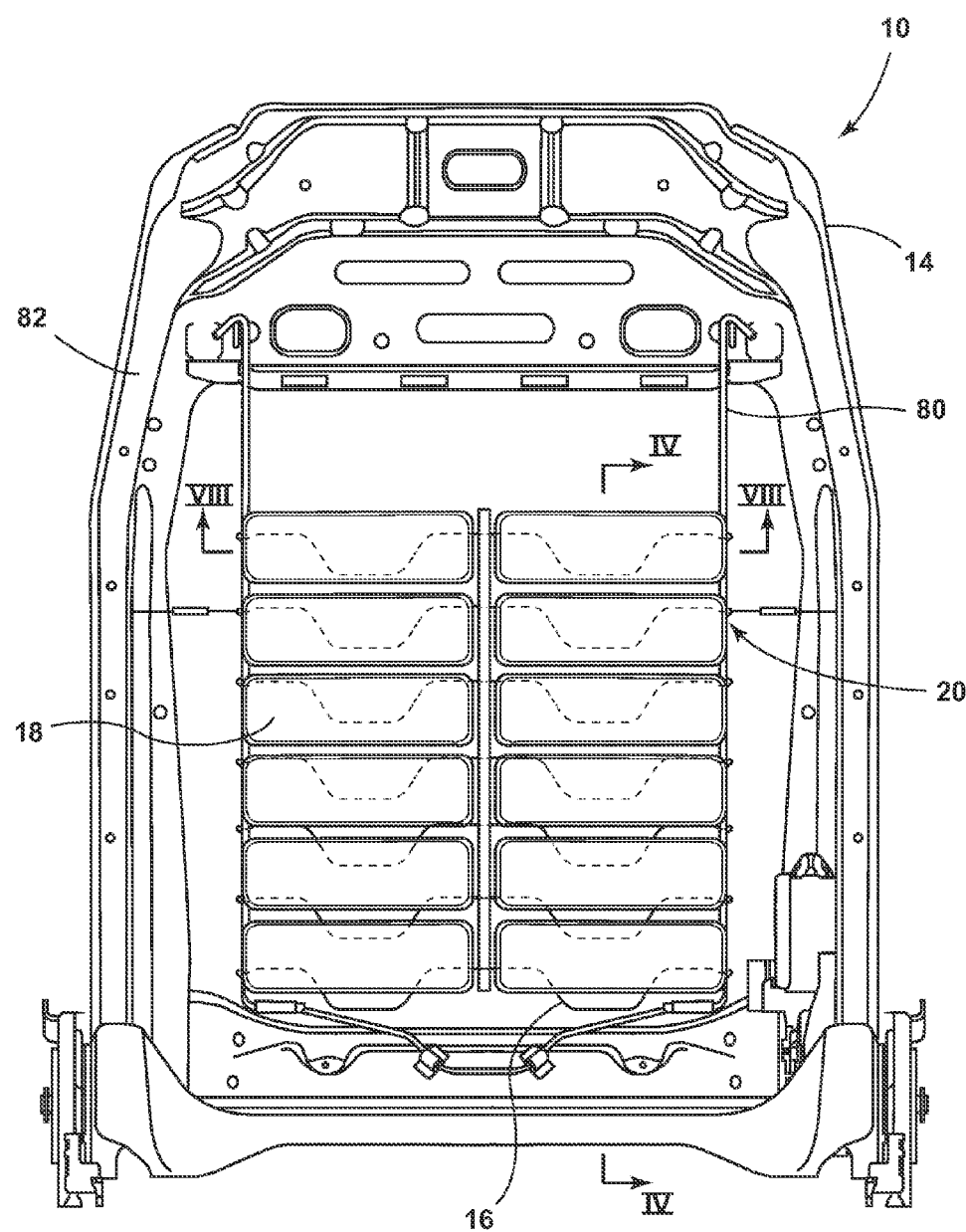
FIG. 3 is a front elevation view of the vehicle seat back of FIG. 2 with the outer cover and back cushion removed.
Figure 5:
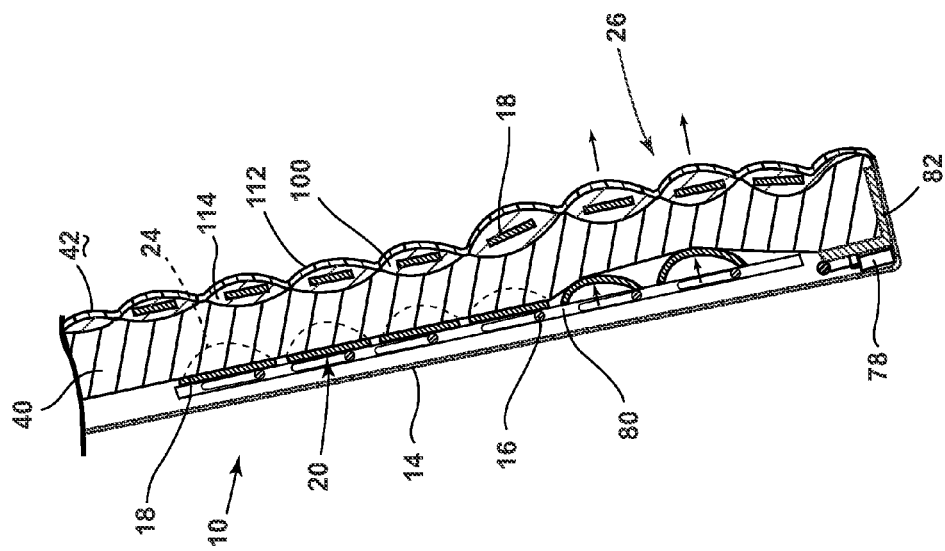
FIG. 5 is a cross-sectional view of the embodiment of FIG. 4 with a portion of the actuators shown in a deformed second state.
Figure 4:
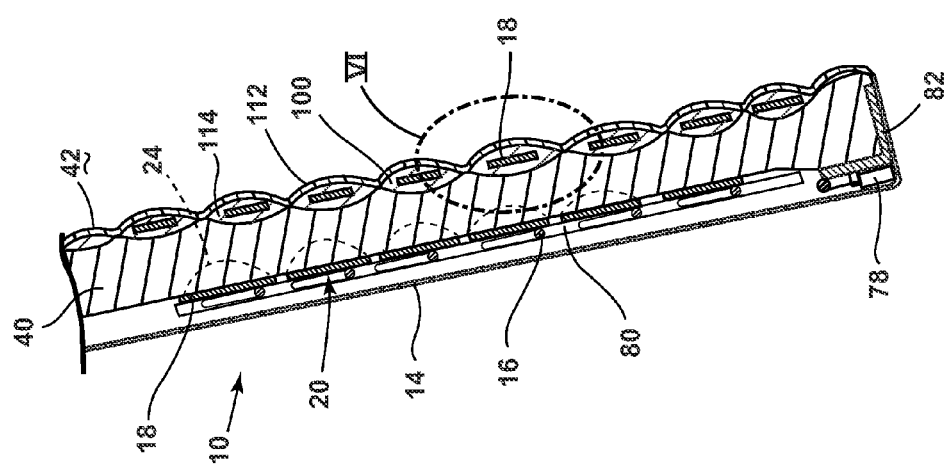
FIG. 4 is a cross-sectional view of the vehicle seat back of FIG. 3 taken at line IV-IV, with the electro-active polymer actuators in a resting first state.
Figure 7:
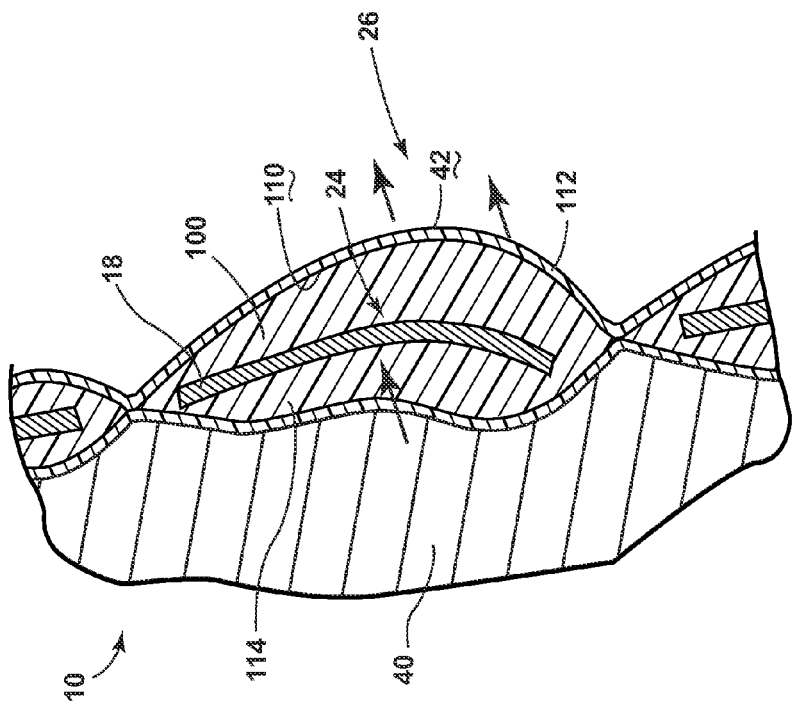
FIG. 7 is a detail cross-sectional view of FIG. 6 showing the actuator in a deformed second state.
Figure 6:
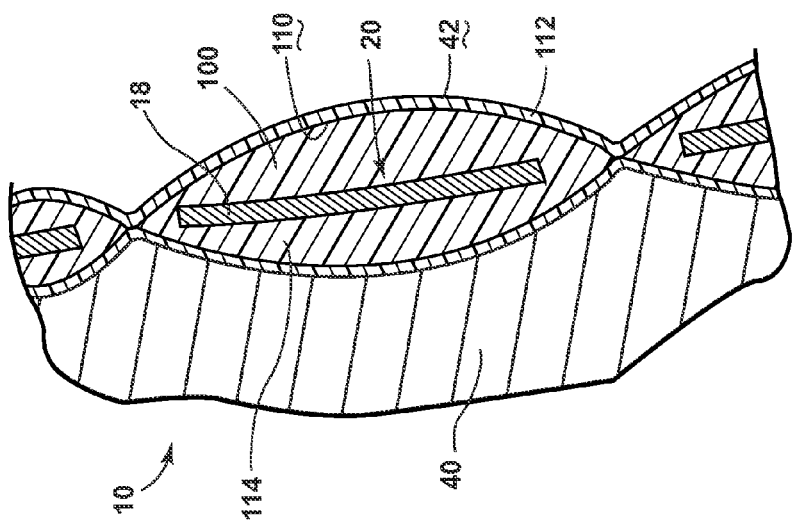
FIG. 6 is a detail cross-sectional view of the embodiment of FIG. 4 taken at area VI and showing the actuator in a resting first state.
Figure 10:
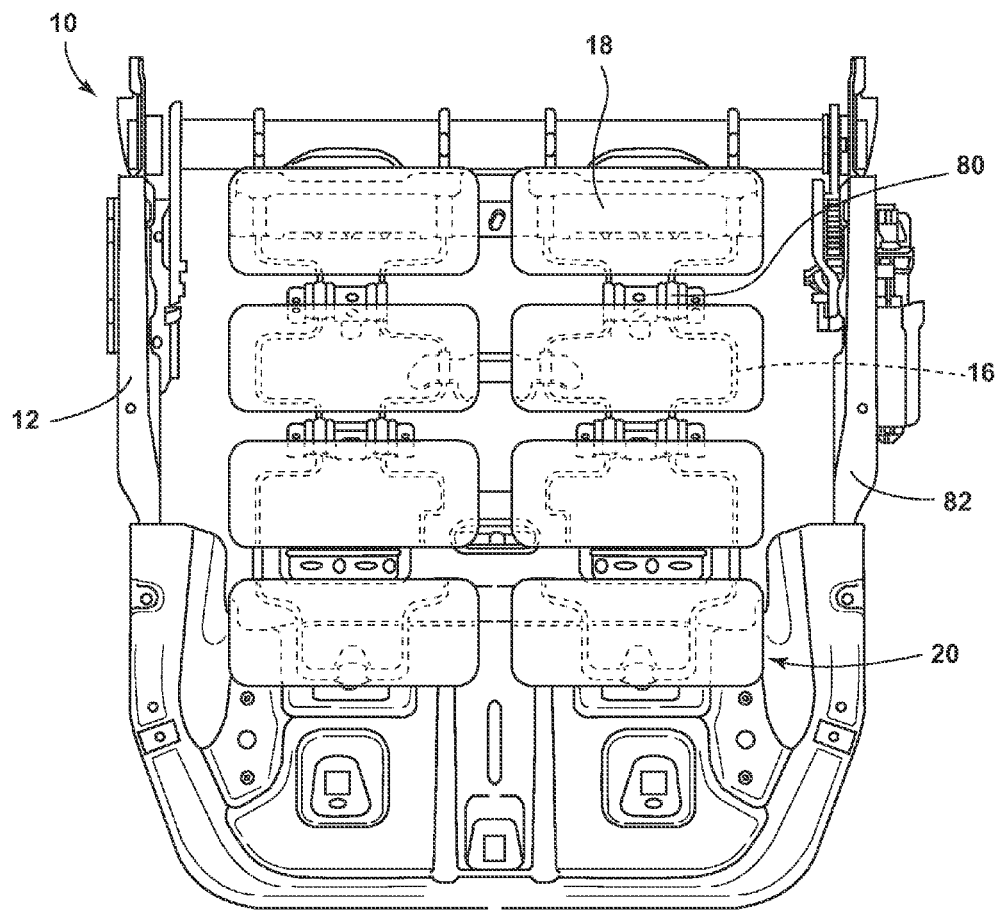
FIG. 10 is a top plan view of the seat base of FIG. 2 with the outer covering and seat cushion removed.

As illustrated in the embodiment of FIGS. 1 and 2, the vehicle seat 10 that includes the actuators 18 is, typically, one of the front seats 68 of the vehicle 70. It is contemplated that the actuators 18 can be disposed in other seats within the vehicle cabin 72, such as rear seats 74, third-row seats, boosters, and other seating locations within the vehicle 70.

In various embodiments, the electro-active polymer actuators 18 are configured to change their shape, size, or both, when an input is applied to the actuator 18. When the input is applied, the actuator 18 is deformed to the second state 24, wherein the second state 24 can be defined by the actuator 18 twisting, bending, shrinking, expanding, other deformations, or a combination of these movements, depending upon the input provided to the actuator 18 and the configuration of the actuator 18.

In various embodiments, the input is a predetermined voltage that is delivered to the actuator 18. In such an embodiment, the amount of voltage and the direction of the current applied to the actuator 18 can determine the exact configuration of the second state 24 of the actuator 18. By way of explanation, and not limitation, a greater voltage can result in a greater deflection or deformation of the actuator 18 and a change in a direction of the current applied to the actuator 18 can result in an alternative deformation of the actuator 18. Additionally, voltages being applied to specific portions of an individual actuator 18 can result in deformation of a portion of the actuator 18 or the entire actuator 18. Again, the exact configuration of the second state 24 of the actuator 18 can be determined by where the predetermined voltage is applied to the actuator 18. In embodiments where the voltage is applied to the actuator 18, the control 22 operating a voltage regulator 78 is disposed proximate the vehicle seat 10 and is configured to be in communication with each of the actuators 18 of the seat back 14, seat base 12 and side bolsters 60.

In various alternate embodiments, the input delivered to the actuator 18 can be a temperature-related input, wherein the amount of heat applied to the actuator 18, and the locations of the applied heat, serves to determine the configuration of the second state 24 of the particular actuator 18, or a portion thereof. Various embodiments can also include actuators 18 that are activated by a magnetic field being applied thereto. In such an embodiment, an electromagnetic field generator can be positioned proximate such actuators 18.

In the various embodiments, the electro-active polymer actuators 18 are typically planar in shape when in the resting or first state 20. The polymer material included within the actuator 18 can be coated with an electrode layer that receives an electrical input from the control 22 and delivers the electrical input to various portions of the polymer actuator 18. Alternatively, the polymer for the actuator 18 can be a self-conducting material that may not include an additional electrode layer. Various electro-active polymers can be used within the vehicle seat 10, wherein the electro-active polymers can include, but are not limited to, dielectric electro-active polymers, ferroelectric polymers, electrostrictive graft polymers, liquid crystal polymers, ionic electro-active polymers, ionic polymer-metal composite, among others. The actuators 18 can also include various viscous polymers that are configured to change viscosity or volume when an electrical current or similar input is applied thereto. These viscous electro-active polymers can include, but are not limited to, electrorheological fluids, stimuli-responsive gels, and other similar viscous electro-active polymers. Each electro-active polymer that may be used within the vehicle seat 10, for one or more comfort functions, is configured to provide a method for manipulating the surface of the vehicle seat 10 to provide varying comfort conditions for the occupant.

Referring now to FIGS. 3-13, the electro-active polymer actuators 18 for the seat back 14, seat base 12, or side bolsters 60 can be attached to an internal suspension structure 80 of the vehicle seat 10. The internal suspension structure 80 of the vehicle seat 10 is attached to a seat frame 82 and provides a base level of comfort for the occupant. The actuators 18 can be attached to the internal suspension structure 80 such that the internal suspension structure 80 provides a substantially stable area to which each of the actuators 18 can be coupled. The exact method of attachment between the actuators 18 and the internal suspension structure 80 or the spring structure 16, or both, can vary, depending upon the type of actuator 18 used. Such attachment methods can include, but are not limited to, adhesives, mechanical fasteners, welding, as well as other similar methods. In the various embodiments where the actuators 18 are attached directly to the internal suspension structure 80, or the spring structure 16, when the actuator 18 receives the input and is deformed into the second state 24, the deformation of the actuator 18 is biased against either the internal suspension structure 80 or the spring structure 16, or both, and generally toward the outer surface 42 of the vehicle seat 10. In this manner, the deformation of the actuator 18 is translated to the outer surface 42 of the vehicle seat 10 of the seat back cushion 40, seat cushion 50, or seat bolster cushion 62 and transferred to the body of the occupant.

In various embodiments, the actuators 18 can be attached to the spring structure 16 or the internal suspension structure 80 by sliding mechanisms, flexible connectors, or other at least partially operable connections. This at least partially operable connection to the structure of the vehicle seat 10 allows the actuators 18 to deform, while also retaining the actuator 18 within its predetermined position within the vehicle seat 10. The type of connection used can also be configured to receive at least a portion of the biasing force exerted by the actuator 18 in the second state 24. It is contemplated that the connection used to couple the actuator 18 to the spring structure 16 or the internal suspension structure 80 can vary depending on the configurations of the second state 24 and the nature of the deformation of the actuator 18. By way of explanation, and not limitation, a connection for an actuator 18 that includes a bending deformation may not be appropriate for an actuator 18 that includes a twisting deformation. It is contemplated that in various embodiments, the actuators 18 for the vehicle seat 10 can be disposed upon an operable frame, wherein the actuators 18 can be moved within the vehicle seat 10 to provide a greater range within which the actuators 18 can manipulate the various portions of the vehicle seat 10.

Referring now to FIGS. 4-7, the electro-active polymer actuators 18 can be disposed proximate the outer surface 42 of the vehicle seat 10 distal from the spring structure 16 and the internal suspension structure 80. In such an embodiment, the actuators 18 are positioned within the back cushion 40, seat cushion 50, or bolster cushion 62, such that the deformation of the actuator 18 can more directly manipulate the outer surface 42 of the vehicle seat 10. By way of explanation, and not limitation, where the actuator 18 is disposed proximate the outer surface 42 of the seat, various movements of the actuators 18, such as twisting or bending, or other movements, can be more directly translated to the outer surface 42 of the vehicle seat 10 such that the outer surface 42 of the vehicle seat 10 deforms in substantially the same manner as the actuator 18. Alternatively, in embodiments where the actuator 18 is attached to the spring structure 16 and/or the internal suspension structure 80, the deformation of each actuator 18 may be, at least partially, absorbed by the seat, back or bolster cushion 50, 40, 62 of the vehicle seat 10 positioned between the actuator 18 and the outer surface 42 of the vehicle seat 10.

As illustrated in the embodiment of FIGS. 4-7, it is contemplated that within the back cushion 40, seat cushion 50 and bolster cushion 62, various configurations of actuators 18 can be implemented, such that certain actuators 18 are disposed proximate the outer surface 42 of the vehicle seat 10, while other actuators 18 are disposed proximate the spring structure 16 and the internal suspension structure 80 of the vehicle seat 10. In this manner, the varying configurations of actuators 18 can be used cooperatively to provide higher level comfort functions to the occupant of the vehicle seat 10. Such higher level functions can include, but are not limited to, lumbar support, adjustable bolster supports, leg supports, and other similar functions that can manipulate the contours of the outer surface 42 of the vehicle seat 10. Additionally, in various embodiments, actuators 18 can be used in a coordinated fashion to provide various vibration and massage functions, wherein the actuators 18 can be operated in a predetermined pattern to provide varying massage or vibration modes to the occupant of the vehicle seat 10. In the vibration and massage-type functions, one or more actuators 18 can be disposed proximate or even attached to an external covering 112 of the vehicle seat 10 such that the actuators 18 are in communication with the external covering 112 in the outer surface 42 of the vehicle seat 10.

Referring again to FIGS. 4-7, in embodiments where one or more of the actuators 18 are disposed proximate an outer surface 42 of the vehicle seating, an external covering 112 of the back cushion 40, seat cushion 50 or bolster cushion 62 can include actuator receptacles 100 or pockets on an interior surface 110 of the exterior covering that are configured to receive one or more of the actuators 18. The receptacles can be formed by members that include, but are not limited by, fabric pockets, straps, mesh or other similar members. In such an embodiment, wiring can be run through the seat cushion 50 to each of the actuators 18 within the actuator receptacles 100, such that the input can be delivered to the actuator 18. Depending upon the electro-active polymer used for the actuator 18, the input from a controller can be delivered to an electro-magnetic field generator, wherein the electro-magnetic field produced by the generator is configured to cause the deformation of the actuator 18 to the second state 24.

In the various embodiments where the actuators 18 are disposed proximate the outer surface 42 of the vehicle seat 10, the actuators 18 can be directly adhered to the interior surface 110 of the external covering 112 of the back cushion 40, seat cushion 50 or bolster cushion 62. In such an embodiment, the deformation of the actuator 18 positioned in this manner can directly translate to the outer surface 42 of the vehicle seat 10 to provide fine adjustment or localized comfort modifications to the occupants of the seat. It is contemplated that in the various embodiments where the actuators 18 are disposed proximate the outer surface 42 of the seat, the actuators 18 can include a padding layer 114 around at least a portion of the outer surface 42 of the actuator 18 to provide additional comfort to the occupant as the actuator 18 is moved between the first and second states 20, 24.

As illustrated in the embodiment of FIGS. 1-7, it is contemplated that multiple comfort functions can be used by the user of the vehicle seat 10 simultaneously. By way of explanation, and not limitation, where actuators 18 are positioned on the spring structure 16 and/or the internal suspension structure 80 also positioned proximate the outer surface 42 of the seat cushion 50, multiple actuators 18 can be simultaneously activated to provide lumbar and massage functions, or vibration and leg support functions, or massage, vibration and back contouring functions, as well as other function combinations.

As illustrated in the embodiment of FIGS. 4-9, the planar electro-active polymer actuators 18 typically include a relatively thin profile. Because of this thin profile, the vehicle seats 10 can typically be made to also have a thinner profile, as larger comfort components such as bladders, compressors, motors, and other conventional seating comfort-related apparatuses may not be included in the vehicle seat 10. Because the vehicle seating 10 can be made to have a thinner profile than conventional seating, additional vehicle cabin 72 space is available to the passengers of the vehicle 70 without sacrificing higher level comfort functions included within the vehicle seating 10.

With reference again to FIG. 1, control 22 is configured to control delivery of the input to one or more of the actuators 18. This control 22 can include switches, dials, capacitive touch screens, resistive touch screens, voice-activated user interfaces, and other similar user interface mechanisms. The control 22 for the actuators 18 can also be located within the dashboard 120, armrest 122, interior side panels 124, center console 126, or other similar location that can be reached by an occupant of the vehicle seat 10 to be controlled.

In operation, the occupant of the vehicle seating 10 that includes one or more planar electro-active polymer actuators 18 can use the control 22 to select one or more comfort-related functions of the vehicle seat 10. When one or more of the functions are selected, the user interface communicates the selection to a voltage regulator 78, heat regulator, electro-magnetic generator, or other regulating device compatible with the type of actuator 18 used within the vehicle seating 10. The regulator used within the vehicle seat 10 can be configured to provide a plurality of input signals that can include, but are not limited to, different magnitudes, different directions, as well as other input variations. When the specific input is delivered to the actuator 18, the actuator 18 deforms to one of the plurality of second states 24 to provide the desired functionality requested by the user of the vehicle seat 10. Where more complex functions, such as vibration or massage modes, are selected by the user of the vehicle seat 10, a predetermined input sequence is delivered to the various actuators 18, such that the actuators 18 deform in a predetermined pattern to provide the desired sequential functionality.

In various embodiments, the planar electro-active polymer actuators 18 can include various shapes and sizes depending upon the particular location of the vehicle seat 10 that the actuator 18 is placed and the function of the particular actuator 18 within the vehicle seat 10. The actuators 18 may also be configured to be non-planar, volumetric, tubular, or can include other varying shapes and configurations, depending upon the particular seating application.

It is contemplated that the actuators 18 can be disposed in other portions of the vehicle 70 that include, but are not limited to, armrests 122, headrests 128, interior side panels 124, as well as other locations, where comfort functions can be provided to the occupant.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seat comprising:
   a seat base and seat back, each including a flexible spring structure and a cushion, wherein the flexible spring structure supports the cushion;
   planar electro-active polymer actuators, each having a first side slidably coupled with the spring structure and an opposing second side distal from the spring structure and in direct contact with the cushion, and each actuator disposed in a first state; and
   a control in communication with the actuators and configured to deliver a predetermined electrical input to one or more of the actuators, wherein the predetermined electrical input acts directly upon the actuator and deforms at least one of the actuators to a second state, wherein the deformation of the actuator from the first state to the second state directly operates the cushion between a plurality of comfort positions.

2. The vehicle seat of claim 1, wherein each of the plurality of comfort positions are determined by a predetermined voltage delivered to one or more of the actuators.

3. The vehicle seat of claim 1, wherein the predetermined electrical input delivers a temperature-related input to one or more of the actuators, and wherein the temperature-related input determines the second state of each actuator.

4. The vehicle seat of claim 1, further comprising:
   a back cushion of the seat back in direct communication with at least one actuator, wherein the deformation of the at least one actuator between the first and second states operates an outer surface of the back cushion between a plurality of back comfort positions.

5. The vehicle seat of claim 1, further comprising:
   a seat cushion of the seat base in direct communication with at least one actuator, wherein the deformation of the at least one actuator between the first and second states operates an outer surface of the seat cushion between a plurality of seat comfort positions.

6. The vehicle seat of claim 1, wherein the second state includes a plurality of actuator positions.

7. The vehicle seat of claim 1, wherein each spring structure includes at least one suspension member, and wherein the first side of each of the actuators is slidably coupled to at least one of the at least one suspension members.

8. The vehicle seat of claim 1, further comprising:
   a side bolster of at least one of the seat back and the seat base; and
   a bolster cushion of the side bolster in direct communication with at least one actuator, wherein the deformation of the at least one actuator between the first and second states operates an outer surface of the bolster cushion between a plurality of bolster comfort positions.

9. A vehicular seat cushion comprising:
planar electro-active polymer actuators having a first side slidably coupled with an internal suspension structure and an opposing second side distal from suspension structure and directly engaging a cushion member, wherein movement of the actuators between resting and deformed states directly manipulates the cushion member to define a plurality of comfort positions, wherein at least one of the actuators is within the cushion member.

10. The vehicular seat cushion of claim 9, further comprising:
a control in communication with each of the actuators and configured to deliver a predetermined electrical input, wherein the predetermined electrical input moves each at least one actuator from the resting state to the deformed state.

11. The vehicular seat cushion of claim 10, wherein the cushion is positioned on at least one of a seat base, a seat back and a side bolster.

12. The vehicular seat cushion of claim 10, wherein the predetermined electrical input is a predetermined voltage, and wherein the predetermined voltage determines the deformed state of the at least one actuator.

13. The vehicular seat cushion of claim 10, wherein the predetermined electrical input delivers a temperature-related input to the at least one actuator, and wherein the temperature-related input determines the second state of each actuator.

14. The vehicular seat cushion of claim 9, wherein the deformed state includes a plurality of actuator positions.

15. A cushion for a vehicle seat, the cushion comprising:
at least one planar electro-active polymer actuator directly engaging a cushion member;
a flexible suspension structure that slidably supports the at least one actuator and supports the cushion member, wherein the at least one actuator is slidably engaged with the suspension structure, and wherein the cushion member engages a side of the at least one actuator that is distal from the flexible suspension structure;
an external covering in communication with the at least one actuator; and
a control in communication with each at least one actuator that delivers a predetermined electrical input, wherein the predetermined electrical input selectively and directly acts upon each at least one actuator and moves the at least one actuator between a resting state and a deformed state.

16. The cushion of claim 15, wherein the cushion is positioned on at least one of a seat base, a seat back and a side bolster.

17. The cushion of claim 15, wherein the predetermined electrical input is a predetermined voltage, and wherein the predetermined voltage determines the deformed state of each at least one actuator.

18. The cushion of claim 15, wherein the predetermined electrical input delivers a temperature-related input to the at least one actuator, and wherein the temperature-related input determines the second state of each actuator.

19. The cushion of claim 16, wherein the at least one actuator includes a plurality of actuators, wherein at least one of the actuators is disposed within the cushion member proximate the external covering.

* * * * *